US012275597B2

(12) United States Patent
Sha et al.

(10) Patent No.: US 12,275,597 B2
(45) Date of Patent: Apr. 15, 2025

(54) SOUND-BASED ROLLER FAULT DETECTING METHOD BY USING DOUBLE-PROJECTION NEIGHBORHOODS PRESERVING EMBEDDING

(71) Applicant: Northeastern University, Liaoning (CN)

(72) Inventors: Xin Sha, Liaoning (CN); Lin Feng, Liaoning (CN); Yingwei Zhang, Liaoning (CN)

(73) Assignee: NORTHEASTERN UNIVERSITY, Liaoning (CN)

( * ) Notice: Subject to any disclaimer, the term of this patent is extended or adjusted under 35 U.S.C. 154(b) by 632 days.

(21) Appl. No.: 17/640,035

(22) PCT Filed: Jul. 21, 2021

(86) PCT No.: PCT/CN2021/107537
§ 371 (c)(1),
(2) Date: Mar. 3, 2022

(87) PCT Pub. No.: WO2022/213512
PCT Pub. Date: Oct. 13, 2022

(65) Prior Publication Data
US 2023/0348197 A1   Nov. 2, 2023

(30) Foreign Application Priority Data
Apr. 7, 2021 (CN) .......................... 202110372937.1

(51) Int. Cl.
*B65G 43/00* (2006.01)
*G06F 17/11* (2006.01)

(52) U.S. Cl.
CPC .............. *B65G 43/00* (2013.01); *G06F 17/11* (2013.01)

(58) Field of Classification Search
CPC ......... B65G 43/00; B65G 43/02; G06F 17/11; G06F 17/10; G06F 17/00; G06F 17/16; G06F 18/214; G10L 25/51
See application file for complete search history.

(56) References Cited

U.S. PATENT DOCUMENTS

2004/0128083 A1* 7/2004 Wang ................. G05B 23/0237
702/35
2010/0030492 A1* 2/2010 Kar ......................... F16C 41/00
702/39
(Continued)

FOREIGN PATENT DOCUMENTS

| CN | 102840979 A | 12/2012 |
| CN | 107963239 A | 4/2018 |
| CN | 113033690 A | 6/2021 |

OTHER PUBLICATIONS

Xiao-ping Jiang and Guan-qiang Cao, "Belt conveyor roller fault audio detection based on the wavelet neural network," *2015 11th International Conference on Natural Computation (ICNC)*, 2015, pp. 954-958.

*Primary Examiner* — Mohamed Charioui
(74) *Attorney, Agent, or Firm* — MUNCY, GEISSLER, OLDS & LOWE, P.C.

(57) ABSTRACT

Provided is a sound-based roller fault detecting method by using double-projection neighborhoods preserving embedding, including: acquiring sound data during operation of a roller, performing a wavelet transform energy feature extraction on normal data in the data to obtain wavelet transform energy feature data, then performing double-projection neighborhoods preserving embedding feature extraction on the wavelet energy feature data to obtain an optimal projection matrix of the feature data, establishing a detection model, constructing $T^2$ statistics of a feature space and a residual space of normal sound data, determining detection (Continued)

control limits according to the $T^2$ statistics by a kernel density estimation method, and further judging whether newly acquired data has faults. According to the present method, main features of the data can be extracted under the conditions of non-dimensional reduction and dimensional reduction, and thus the present method can achieve the purpose of increasing fault detection accuracy.

4 Claims, 4 Drawing Sheets

(56) References Cited

U.S. PATENT DOCUMENTS

| | | | |
|---|---|---|---|
| 2011/0290024 A1* | 12/2011 | Lefler | G01H 1/003 |
| | | | 73/579 |
| 2013/0207810 A1* | 8/2013 | Kar | G01M 13/021 |
| | | | 340/686.3 |
| 2016/0282416 A1* | 9/2016 | Choi | G01R 31/343 |
| 2019/0095781 A1* | 3/2019 | Vedula | G01H 17/00 |

\* cited by examiner (a)

(b)

(a)

(b)

SOUND-BASED ROLLER FAULT DETECTING METHOD BY USING DOUBLE-PROJECTION NEIGHBORHOODS PRESERVING EMBEDDING

BACKGROUND OF THE INVENTION

1. Field of the Invention

The invention relates to the technical field of fault detection, in particular to a sound-based roller fault detecting method by using double-projection neighborhoods preserving embedding.

2. The Prior Arts

At present, the most common fault detecting method for conveyor belt rollers adopts manual detection. However, actual requirements cannot be met by simply relying on traditional manual detection methods. Moreover, traditional manual detection has a huge risk for workers, and has a low efficiency and a low precision, so that the production requirements of modern mines cannot be met. Therefore, there is a need for an intelligent roller fault detecting method.

SUMMARY OF THE INVENTION

With respect to the technical deficiency in the prior art, the invention provides a sound-based roller fault detecting method by using double-projection neighborhoods preserving embedding to acquire sound data during operation of a roller, and judge whether the roller has fault.

To solve the above-mentioned technical problem, the technical solution adopted by the invention is a sound-based roller fault detecting method by using double-projection neighborhoods preserving embedding comprising the following steps:

Step 1: acquiring operation sound data of a normal roller;
Step 2: pre-processing the sound data through sliding windows to obtain n sound data samples as training samples;
Step 3: performing a wavelet transform energy feature extraction on the sound data samples to obtain primary feature data;
Step 4: obtaining an optimal projection matrix W of the primary feature data by using a double-projection neighborhoods preserving embedding feature extraction method, wherein the specific method comprises the steps:
Step 4.1: constructing an object function $f(W)$ of the optimal projection matrix W:

$$f(W) = \min \sum_{i=1}^{n} \left\| W^T Q^T x_i - W^T Q^T \sum_{j=1}^{k} a_{ij} x_{ij} \right\|_2 + \lambda \left\| (Q^T X)^T \right\|_{21} \quad (1)$$

s.t. $W^T W = I$.

Wherein $X \in R^{m \times n}$ is a training sample data matrix, m is the dimension of the training sample, $W \in R^{m \times l}$ is the optimal projection matrix of the primary feature data, l is the number of eigenvectors of the feature space of the training data, $\lambda$ is an trade off parameter, $x_i$ represents an i-th training sample, $x_{ij}$ represents a j-th neighbor point of $x_i$, k represents the number of neighbor points of $x_i$, $a_{ij}$ is a weight of k neighbor points of $x_i$, obtained through solving by a neighborhoods preserving embedding algorithm, a matrix Q is used for extracting features of training sample data under the condition of non-dimensional reduction, and I is a unit vector;

Letting $$y_i = x_i - \sum_{j=1}^{k} a_{ij} x_{ij},$$

due to the constraint condition $W^T W = I$, letting $Q = WW^T$, and modifying the object function $f(W)$ as:

$f(W) = \min \|(W^T Y)\|_{21} + \lambda \|(WW^T X)^T\|_{21}$ $s.t. \cdot W^T W = I$ \quad (2).

Wherein $Y = [y_1, y_2, \ldots, y_n]$;
Step 4.2: solving the object function $f(W)$ by an iterative method to obtain the optimal projection matrix W;
Arranging the modified object function $f(W)$ as:

$$f(W) = \sum_{i=1}^{n} \frac{\|W^T y_i\|_2^2}{\|W^T y_i\|_2} + \lambda \sum_{i=1}^{n} \frac{\|WW^T x_i\|_2^2}{\|WW^T x_i\|_2} \quad (3)$$

$$= tr(W^T Y D_1 (W^T Y)^T) + \lambda tr(WW^T X D_2 (WW^T X)^T)$$

$$= tr(W^T Y D_1 Y^T W) + \lambda tr(W^T X D_2 X^T W)$$

Wherein $$D_1 = \begin{bmatrix} \|W^T y_1\|_2^{-1} & & & \\ & \|W^T y_2\|_2^{-1} & & \\ & & \ddots & \\ & & & \|W^T y_n\|_2^{-1} \end{bmatrix}, \quad (4)$$

$$D_2 = \begin{bmatrix} \|WW^T x_1\|_2^{-1} & & & \\ & \|WW^T x_2\|_2^{-1} & & \\ & & \ddots & \\ & & & \|WW^T x_n\|_2^{-1} \end{bmatrix}. \quad (5)$$

Defining $(W^T y_i)$ as an i-th column of the matrix $(W^T Y)$, defining $(WW^T x_i)$ as an i-th column of the matrix $(WW^T X)$, and constructing a Lagrangian function for the object function $f(W)$, to obtain:

$L(W) = tr(W^T Y D_1 Y^T W) + \lambda tr(W^T X D_2 X^T W) - tr(\delta(W^T W - I))$ \quad (6).

Wherein $L(W)$ is the Lagrangian function, and $\delta$ is a Lagrangian multiplier;
Taking the derivative of the Lagrange function of formula (6) with respect to W and setting the derivative to 0, to obtain:

$2YD_1Y^T W + 2\lambda XD_2X^T W - 2\delta W = 0$ \quad (7).

Further arranging the formula (7) to obtain:

$(YD_1Y^T + \lambda XD_2X^T)W = \delta W$ \quad (8).

Solving eigenvalues and eigenvectors of $(YD_1Y^T + \lambda XD_2X^T)$, sorting the eigenvalues from small to large, selecting l eigenvectors corresponding to the smallest l eigenvalues to be used as row vectors to form the optimal projection matrix W, forming column vectors of a residual projection matrix $W_{res}$ from the eigenvectors corresponding to the last (m−l) smallest eigenvalues.

According to the above formulas (3)-(8), iteratively solving the optimal projection matrix W and the residual projection matrix $W_{res}$, wherein the specific method comprises the steps:

(1) Setting the optimal projection matrix W at an initial iteration as a random matrix $W_0$ of m×l, and setting an initial iteration number of times t=1;

(2) Calculating $D_{1t}$ and $D_{2t}$ at the t-th time of iteration according to formulas (4) and (5);

(3) According to the formula (8), solving the eigenvectors of $(YD_{1t}Y^T + \lambda XD_{2t}X^T)$ at the t-th time of iteration, and then solving the optimal projection matrix $W_t$ at the t-th time of iteration;

(4) If the object function $f(W_t) - f(W_{t-1}) \leq 10^{-12}$ making the object function to converge, ending the iteration to obtain the final optimal projection matrix W and residual projection matrix $W_{res}$, else, letting the number of times of iterations t be incremented by 1, using the optimal projection matrix $W_t$ at the t-th time of iteration as an input for the next iteration, and repeating the Step (2);

Step 5: solving a feature space and a residual space of the training data according to a final optimal projection matrix W obtained in Step 4;

Step 6: constructing $T^2$ statistics of the feature space and the residual space of the training data, respectively, by using a $T^2$ statistics method.

Wherein the $T^2$ statistics of the feature space and the residual space of the constructed training data are shown as the following formulas:

$$T^2 = n \times (W^T x)^T \Sigma_c^{-1} (W^T x) \quad (9),$$

$$T_{res}^2 = n \times (W_{res}^T x)^T \Sigma_{res}^{-1} (W_{res}^T x) \quad (10).$$

Wherein $T^2$ is the $T^2$ statistic of the feature space of the training data, $T_{res}^2$ is the $T^2$ statistic of the residual space of the training data, $\Sigma_c = (W^T X)(W^T X)^T$, $\Sigma_{res} = (W_{res}^T X)(W_{res}^T X)^T$, and x represents the training sample or a test sample;

Step 7: determining detection control limits $J_{th,c}$ and $J_{th,res}$ according to the $T^2$ statistics of the feature space and the residual space of the training data by using a kernel density estimation method; and Step 8: after online acquiring the operation sound data of the roller and performing a standardizing process, according to the method of Steps 4-6, obtaining the $T^2$ statistics $T'^2$ and $T_{res}'^2$ of the feature space and the residual space of the online data, detecting faults of the roller according to a relationship between the $T^2$ statistics of the feature space and the residual space of the online data and the detection control limits $J_{th,c}$ and $J_{th,res}$.

If $T'^2 > J_{th,c}$ or $T_{res}'^2 > J_{th,res}$, indicating that a fault occurs during operation of the roller;

If $T'^2 \leq J_{th,c}$ and $T_{res}'^2 \leq J_{th,res}$ indicating that the roller operates normally.

Compared with a single projection feature extraction algorithm, the sound-based roller fault detecting method by using double-projection neighborhoods preserving embedding, by adopting the technical solution of the invention has the beneficial effects: the double-projection neighborhoods preserving embedding has two kinds of projection including non-dimensional reduction projection and dimensional reduction projection, parts of tiny features not relevant to key features in the data can be removed through non-dimensional reduction projection, the dimension of the data can be reduced through the dimensional reduction projection, and the visibility of the data can be increased; and therefore. According to the method of the present invention, main features of faulty audio frequency can be obtained, and the detecting rate of the faulty audio frequency can be increased.

DETAILED DESCRIPTION OF THE PREFERRED EMBODIMENT

The specific implementations of the invention are described in more detail below with reference to the accompanying drawings and embodiments. The following embodiments are intended to illustrate the invention, rather than to limit the scope of the invention.

Figure 1:
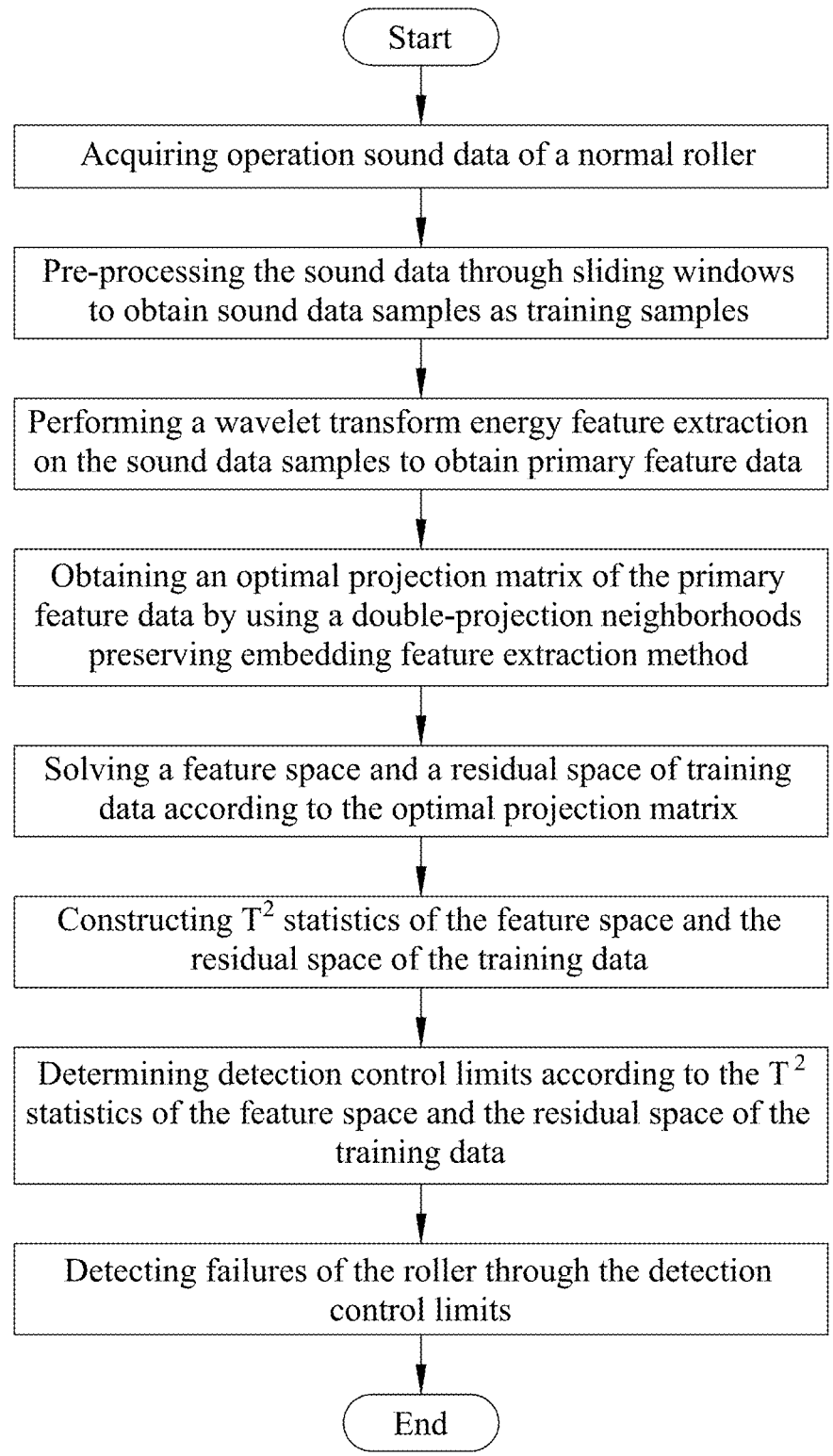
FIG. 1 is a flow chart of a sound-based roller fault detecting method by using double-projection neighborhoods preserving embedding according to embodiments of the invention.

In the embodiments, a sound-based roller fault detecting method by using double-projection neighborhoods preserving embedding, as shown in FIG. 1, comprises the following steps:

Step 1: acquiring operation sound data of a normal roller;

Step 2: pre-processing the sound data through sliding windows to obtain n sound data samples as training samples;

Step 3: performing a wavelet transform energy feature extraction on the sound data samples to obtain primary feature data;

Step 4: obtaining an optimal projection matrix W of the primary feature data by using a double-projection neighborhoods preserving embedding feature extraction method, wherein the specific method comprises the steps:

Step 4.1: constructing an object function $f(W)$ of the optimal projection matrix W:

$$f(W) = \min \sum_{i=1}^{n} \left\| W^T Q^T x_i - W^T Q^T \sum_{j=1}^{k} a_{ij} x_{ij} \right\|_2 + \lambda \left\| (Q^T X)^T \right\|_{21} \quad (1)$$

s.t. $W^T W = I$.

Wherein $X \in R^{m \times n}$ is a training sample data matrix, m is a dimension of the training sample, $W \in R^{m \times n}$ is the optimal projection matrix of the primary feature data, l is the number of eigenvectors of the feature space of the training data, $\lambda$ is an equilibrium parameter, $x_i$ represents an i-th training sample, $x_{ij}$ represents a j-th neighbor point of $x_i$, k represents the number of neighbor points of $x_i$, $a_{ij}$ is a weight of k neighbor points of $x_i$, obtained through solving by a neighborhoods preserving embedding algorithm, a matrix Q is used for extracting features of training sample data under the condition of no dimension reduction, and I is a unit vector;

Letting $$y_i = x_i - \sum_{j=1}^{k} a_{ij} x_{ij},$$

due to the constraint condition $W^T W = I$, letting $Q = WW^T$, and modifying the object function $f(W)$ as:

$$f(W) = \min \|(W^T Y)\|_{2,1} + \lambda \|(WW^T X)^T\|_{2,1}$$

$$s.t. \cdot W^T W = I \quad (2).$$

Wherein $Y = [y_1, y_2, \ldots, y_n]$;

Step 4.2: solving the object function $f(W)$ by an iterative method to obtain the optimal projection matrix W because the object function is a non-smooth convex function;

Arranging the modified object function $f(W)$ as:

$$f(W) = \sum_{i=1}^{n} \frac{\|W^T y_i\|_2^2}{\|W^T y_i\|_2} + \lambda \sum_{i=1}^{n} \frac{\|WW^T x_i\|_2^2}{\|WW^T x_i\|_2} \quad (3)$$
$$= tr(W^T Y D_1 (W^T Y)^T) + \lambda tr(WW^T X D_2 (WW^T X)^T)$$
$$= tr(W^T Y D_1 Y^T W) + \lambda tr(W^T X D_2 X^T W)$$

Wherein $$D_1 = \begin{bmatrix} \|W^T y_1\|_2^{-1} & & & \\ & \|W^T y_2\|_2^{-1} & & \\ & & \ldots & \\ & & & \|W^T y_n\|_2^{-1} \end{bmatrix}, \quad (4)$$

$$D_2 = \begin{bmatrix} \|WW^T x_1\|_2^{-1} & & & \\ & \|WW^T x_2\|_2^{-1} & & \\ & & \ldots & \\ & & & \|WW^T x_n\|_2^{-1} \end{bmatrix}. \quad (5)$$

Defining $(W^T y_i)$ as an i-th column of the matrix $(W^T Y)$, defining $(WW^T x_i)$ as an i-th column of the matrix $(WW^T X)$, and constructing a Lagrangian function for the object function $f(W)$, to obtain:

$$L(W) = tr(W^T Y D_1 Y^T W) + \lambda tr(W^T X D_2 X^T W) - tr(\delta(W^T W - I)) \quad (6).$$

Wherein $L(W)$ is the Lagrangian function, and $\delta$ is a Lagrangian multiplier;

Taking the derivative of the Lagrange function of formula (6) with respect to W and setting the derivative to 0, to obtain:

$$2YD_1 Y^T W + 2\lambda X D_2 X^T W - 2\delta W = 0 \quad (7).$$

Further arranging the formula (7) to obtain:

$$(YD_1 Y^T + \lambda X D_2 X^T) W = \delta W \quad (8).$$

Solving eigenvalues and eigenvectors of $(YD_1 Y^T + \lambda X D_2 X^T)$, sorting the eigenvalues from small to large, selecting l eigenvectors corresponding to the smallest l eigenvalues to be used as row vectors to form the optimal projection matrix W forming column vectors of a residual projection matrix $W_{res}$ from the eigenvectors corresponding to the last (m−l) smallest eigenvalues.

According to the above formulas (3)-(8), iteratively solving the optimal projection matrix W and the residual projection matrix $W_{res}$, wherein the specific method comprises the steps:

(1) Setting the optimal projection matrix W at an initial iteration as a random matrix $W_0$ of m×l, and setting an initial iteration number of times t=1;
(2) Calculating $D_{1t}$ and $D_{2t}$ at the t-th time of iteration according to formulas (4) and (5);
(3) According to the formula (8), solving the eigenvectors of $(YD_{1t} Y^T + \lambda X D_{2t} X^T)$ at the t-th time of iteration, and then solving the optimal projection matrix $W_t$ at the t-th time of iteration;
(4) If the object function $f(W_t) - f(W_{t-1}) \leq 10^{-12}$, making the object function to converge, ending the iteration to obtain the final optimal projection matrix W and residual projection matrix $W_{res}$, else, letting the number of times of iterations t be incremented by 1, using the optimal projection matrix $W_t$ at the t-th time of iteration as an input for the next iteration, and repeating the Step (2);

Step 5: solving a feature space and a residual space of the training data according to a final optimal projection matrix W obtained in Step 4;

Step 6: constructing $T^2$ statistics of the feature space and the residual space of the training data, respectively, by using a $T^2$ statistics method.

Wherein the $T^2$ statistics of the feature space and the residual space of the constructed training data are shown as the following formulas:

$$T^2 = n \times (W^T x)^T \Sigma_c^{-1} (W^T x) \quad (9),$$

$$T_{res}^2 = n \times (W_{res}^T x)^T \Sigma_{res}^{-1} (W_{res}^T x) \quad (10).$$

Wherein $T^2$ is the $T^2$ statistic of the feature space of the training data, $T_{res}^2$ is the $T^2$ statistic of the residual space of the training data, $\Sigma_c = (W^T X)(W^T X)^T$, $\Sigma_{res} = (W_{res}^T X)(W_{res}^T X)^T$, and x represents the training sample or a test sample;

Step 7: determining detection control limits $J_{th,c}$ and $J_{th,res}$ according to the $T^2$ statistics of the feature space and the residual space of the training data by using a kernel density estimation method; and Step 8: after online acquiring the operation sound data of the roller and performing a standardizing process, according to the method of Steps 4-6, obtaining the $T^2$ statistics $T'^2$ and $T_{res}'^2$ of the feature space and the residual space of the online data, detecting faults of the roller according to a relationship between the $T^2$ statistics of the feature space and the residual space of the online data and the detection control limits $J_{th,c}$ and $J_{th,res}$.

If $T'^2 > J_{th,c}$ or $T_{res}'^2 > J_{th,res}$ indicating that a fault occurs during operation of the roller; and If $T'^2 \leq J_{th,c}$ and $T_{res}'^2 \leq J_{th,res}$ indicating that the roller operates normally.

In the embodiments, the sound data of the roller in three kinds of faults and the sound data of the roller under normal condition are acquired. The three kinds of faults are respectively the sliding friction fault of the roller and the belt, the fault of the roller having soil, and the fault of the roller lacking oil. After the sound data under different conditions are processed by a sliding window, 1000 pieces of sample data of each kind are obtained through a wavelet transform energy feature extraction. In four kinds of data sets, the first 500 pieces of the sample data are used as training data, and the last 500 pieces of the sample data are used as test data.

Figure 2:
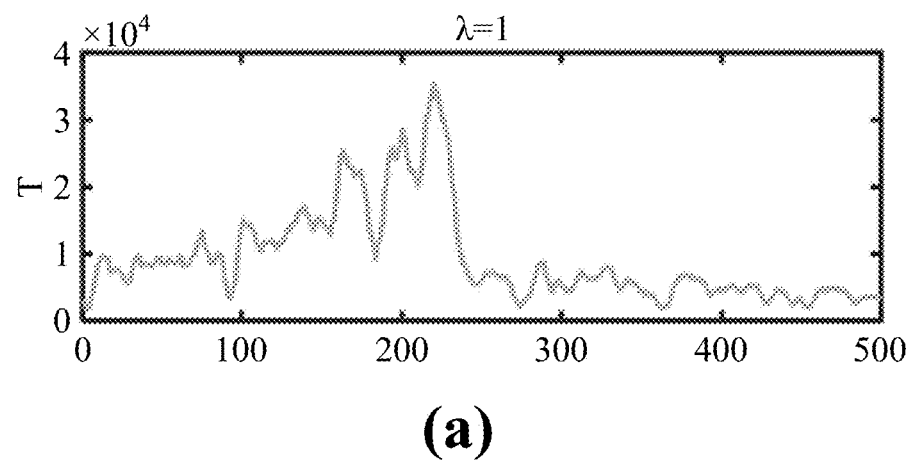
FIG. 2 is a diagram showing a detection result for sliding friction fault of a roller and a belt according to embodiments of the invention.
Figure 2:
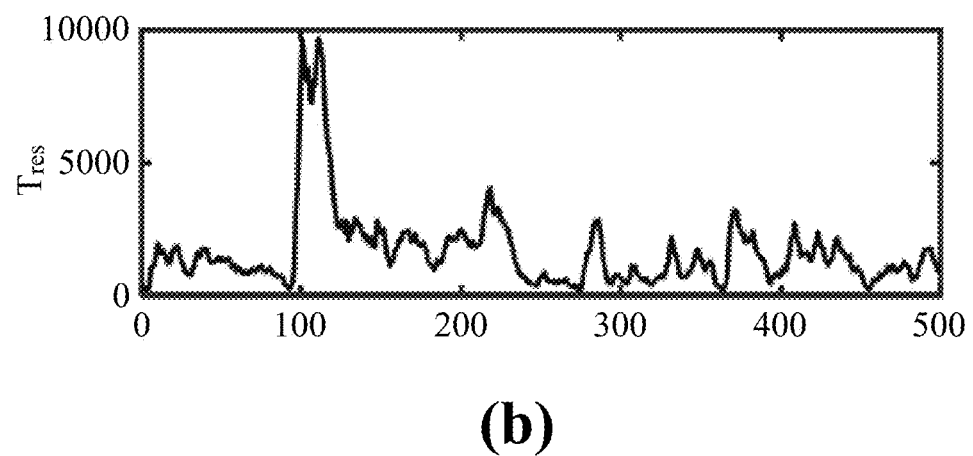
Figure 3:
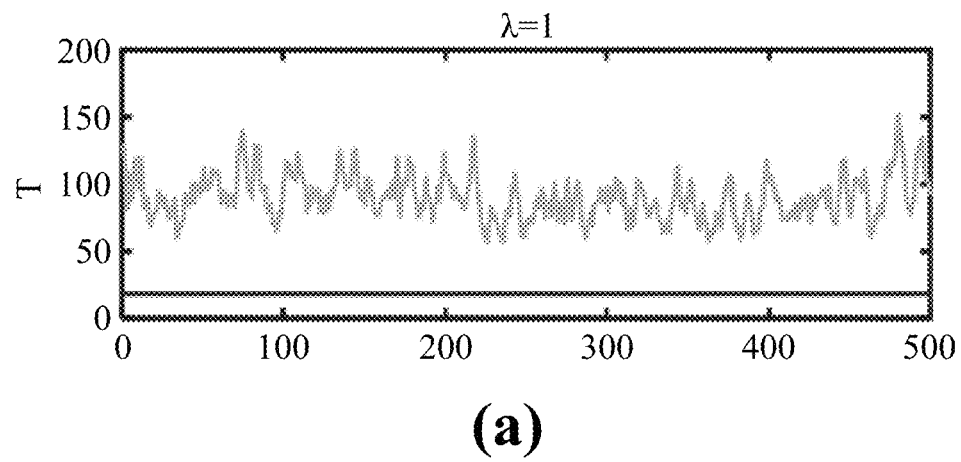
FIG. 3 is a diagram showing the detection result for fault of the roller having soil according to embodiments of the invention.
Figure 3:
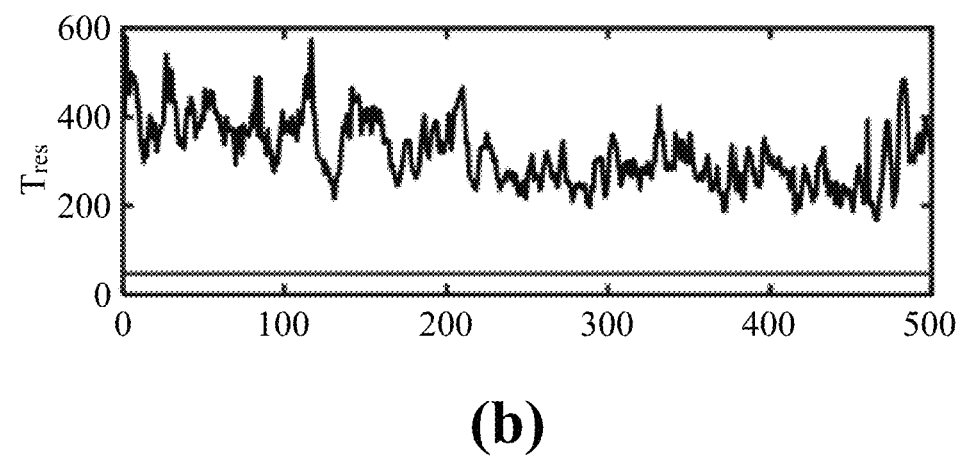
Figure 4:
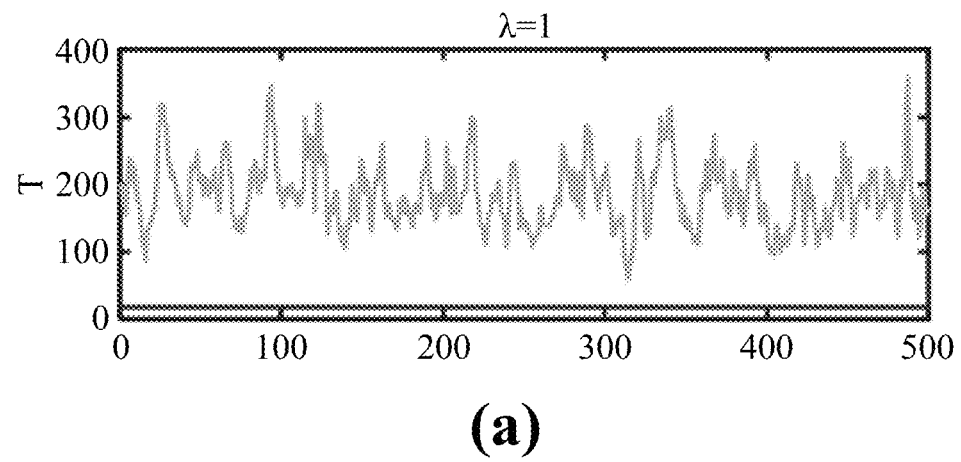
FIG. 4 is a diagram showing the detection result for fault of the roller lacking oil according to embodiments of the invention.
Figure 4:
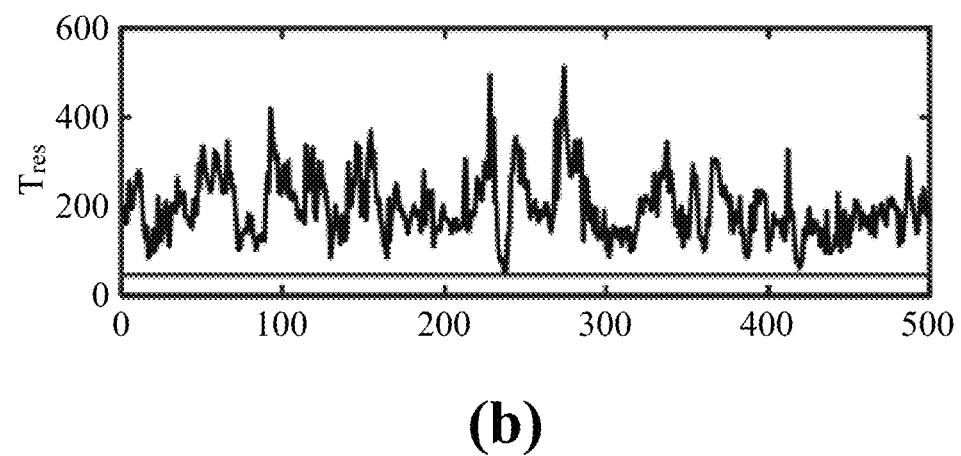

In the embodiments, the detection results for the three kinds of roller faults are shown in FIGS. 2-4. In the figures, the statistics (curves) of the feature space and the statistics (curves) of the residual space of the three kinds of faults are respective within control limits (straight line), so that the fault detecting method disclosed by the invention can meet the actual requirements for roller fault detection.

Finally, it should be noted that the embodiments are merely intended to describe the technical schemes of the invention, rather than to limit the invention. Although the invention is described in detail with reference to the above embodiments, persons of ordinary skilled in the art should understand that they may still make modifications to the technical schemes described in the above embodiments or make equivalent replacements to some or all technical features thereof. However, these modifications or replacements do not cause the essence of the corresponding technical schemes to depart from the scope of the technical schemes of the embodiments of the invention.

What is claimed is:

1. A sound-based roller fault detecting method by using double-projection neighborhoods preserving embedding, comprising the following steps:

Step 1: acquiring operation sound data of a normal roller;

Step 2: pre-processing the sound data through sliding windows to obtain n sound data samples as training samples;

Step 3: performing a wavelet transform energy feature extraction on the sound data samples to obtain primary feature data;

Step 4: obtaining an optimal projection matrix W of the primary feature data by using a double-projection neighborhoods preserving embedding feature extraction method;

Step 5: solving a feature space and a residual space of training data according to a final optimal projection matrix W obtained in Step 4;

Step 6: constructing $T^2$ statistics of the feature space and the residual space of the training data, respectively, by using a $T^2$ statistics method;

Step 7: determining detection control limits $J_{th,c}$ and $J_{th,res}$ according to the $T^2$ statistics of the feature space and the residual space of the training data by using a kernel density estimation method; and Step 8: after online acquiring the operation sound data of the roller and performing a standardizing process, according to the Steps 4-6, obtaining the $T^2$ statistics $T'^2$ and $T_{res}'^2$ of the feature space and the residual space of the online data, detecting fault of the roller according to a relationship between the $T^2$ statistics of the feature space and the residual space of the online data and the detection control limits $J_{th,c}$ and $J_{th,res}$, if $T'^2 > J_{th,c}$ or $T_{res}'^2 > J_{th,res}$, indicating that a fault occurs during operation of the roller; and if $T'^2 \leq J_{th,c}$ and $T_{res}'^2 \leq J_{th,res}$, indicating that the roller operates normally, wherein, the double-projection neighborhoods preserving embedding includes a non-dimensional reduction projection and a dimensional reduction projection, and wherein, parts of tiny features not relevant to key features in the sound data are removed through the non-dimensional reduction projection, and the dimension of the sound data is reduced through the dimensional reduction projection, so as to increase the visibility of the sound data.

2. The method according to claim 1, wherein the specific method of Step 4 comprises:

Step 4.1: constructing an object function $f(W)$ of the optimal projection matrix W:

$$f(W) = \min \sum_{i=1}^{n} \left\| W^T Q^T x_i - W^T Q^T \sum_{j=1}^{k} a_{ij} x_{ij} \right\|_2 + \lambda \left\| (Q^T X)^T \right\|_{21} \quad (1)$$

s.t. $W^T W = I$, wherein $X \in R^{m \times n}$ is a training sample data matrix, m is a dimension of the training sample, $W \in R^{m \times l}$ is the optimal projection matrix of the primary feature data, l is the number of eigenvectors of the feature space of the training data, $\lambda$ is an equilibrium parameter, $x_i$ represents an i-th training sample, $x_{ij}$ represents a j-th neighbor point of $x_i$, k represents the number of neighbor points of $x_i$, $a_{ij}$ is a weight of k neighbor points of $x_i$, obtained through solving by a neighborhoods preserving embedding algorithm, a matrix Q is used for extracting features of training sample data under the condition of no dimension reduction, and I is a unit vector;

letting $$y_i = x_i - \sum_{j=1}^{k} a_{ij} x_{ij},$$

due to a constraint condition $W^T W = I$, letting $Q = WW^T$, and modifying the object function $f(W)$ as:

$f(W) \min \|(W^T Y)\|_{21} + \lambda \|(WW^T X)^T\|_{21}$ $s.t. W^T W = I$ \quad (2)

wherein $Y = [y_1, y_2, \ldots, y_n]$;

Step 4.2: solving the object function $f(W)$ by an iterative method to obtain the optimal projection matrix W;

arranging the modified object function $f(W)$ as:

$$f(W) = \sum_{i=1}^{n} \frac{\|W^T y_i\|_2^2}{\|W^T y_i\|_2} + \lambda \sum_{i=1}^{n} \frac{\|WW^T x_i\|_2^2}{\|WW^T x_i\|_2} \quad (3)$$

$= tr(W^T Y D_1 (W^T Y)^T) + \lambda tr(WW^T X D_2 (WW^T X)^T)$, $= tr(W^T Y D_1 Y^T W) + \lambda tr(W^T X D_2 X^T W)$ wherein $$D_1 = \begin{bmatrix} \|W^T y_1\|_2^{-1} & & & \\ & \|W^T y_2\|_2^{-1} & & \\ & & \ldots & \\ & & & \|W^T y_n\|_2^{-1} \end{bmatrix}, \quad (4)$$

$$D_2 = \begin{bmatrix} \|WW^T x_1\|_2^{-1} & & & \\ & \|WW^T x_2\|_2^{-1} & & \\ & & \ldots & \\ & & & \|WW^T x_n\|_2^{-1} \end{bmatrix}; \quad (5)$$

defining $(W^T y_i)$ as an i-th column of the matrix $(W^T Y)$, defining $(WW^T x_i)$ as an i-th column of the matrix $(WW^T X)$, and constructing a Lagrangian function for the object function $f(W)$, to obtain:

$L(W) = tr(W^T Y D_1 Y^T W) + \lambda tr(W^T X D_2 X^T W) - tr(\delta(W^T W - I))$ \quad (6), wherein $L(W)$ is the Lagrangian function, and $\lambda$ is a Lagrangian multiplier;

taking the derivative of the Lagrange function of formula (6) with respect to W and setting the derivative to 0, to obtain:

$$2YD_1Y^TW+2\lambda XD_2X^TW=2\delta W=0 \qquad (7),$$

further arranging the formula (7) to obtain:

$$(YD_1Y^T+\lambda XD_2X^T)W=\delta W \qquad (8);$$

solving eigenvalues and eigenvectors of $(YD_1Y^T+\lambda XD_2X^T)$, sorting the eigenvalues from small to large, selecting l eigenvectors corresponding to the smallest l eigenvalues to be used as row vectors to form the optimal projection matrix W, forming column vectors of a residual projection matrix $W_{res}$ from the eigenvectors corresponding to the last (m−l) smallest eigenvalues, according to the above formulas (3)-(8), iteratively solving the optimal projection matrix W and the residual projection matrix $W_{res}$.

3. The method according to claim 2, wherein in the Step 4.2, according to the above formulas (3)-(8), the specific method for iteratively solving the optimal projection matrix W and the residual projection matrix $W_{res}$ comprises the following steps:
   (1) setting the optimal projection matrix W at an initial iteration as a random matrix $W_0$ of m×l, and setting an initial iteration number of times t=1;
   (2) calculating $D_{1t}$ and $D_{2t}$ at the t-th time of iteration according to formulas (4) and (5);
   (3) according to the formula (8), solving the eigenvectors of $(YD_{1t}Y^T+\lambda XD_{2t}X^T)$ at the t-th time of iteration, and then solving the optimal projection matrix $W_t$ at the t-th time of iteration; and
   (4) if the object function $f(W_t)-f(W_{t-1})\leq 10^{-12}$, making the object function to converge, ending the iteration to obtain the final optimal projection matrix W and residual projection matrix $W_{res}$, else, letting the number of times of iterations t be incremented by 1, using the optimal projection matrix $W_t$ at the t-th time of iteration as an input for the next iteration, and repeating the Step (2).

4. The method according to claim 3, wherein the $T^2$ statistics of the feature space and the residual space of the training data constructed in the Step 6 are shown in the following formula:

$$T^2=n\times(W^Tx)^T\Sigma_c^{-1}(W^Tx) \qquad (9),$$

$$T_{res}^2=n\times(W_{res}^Tx)^T\Sigma_{res}^{-1}(W_{res}^Tx) \qquad (10),$$

wherein $T^2$ is the $T^2$ statistic of the feature space of the training data, $T_{res}^2$ is the $T^2$ statistic of the residual space of the training data, $\Sigma_c=(W^TX)(W^TX)^T$, $\Sigma_{res}=(W_{res}^TX)(W_{res}^TX)_T$, and x represents the training sample or a test sample.

\* \* \* \* \*